(12) United States Patent
Marone

(10) Patent No.: US 10,233,685 B2
(45) Date of Patent: Mar. 19, 2019

(54) VALVE DEVICE FOR AN ICE CUBE DISPENSING CONDUIT IN A REFRIGERATOR

(71) Applicant: ELBI INTERNATIONAL S.p.A., Turin (IT)

(72) Inventor: Giuseppe Marone, Nichelino (IT)

(73) Assignee: ELBI INTERNATIONAL S.P.A., Turin (IT)

(*) Notice: Subject to any disclaimer, the term of this patent is extended or adjusted under 35 U.S.C. 154(b) by 0 days.

(21) Appl. No.: 15/657,706

(22) Filed: Jul. 24, 2017

(65) Prior Publication Data

US 2018/0023875 A1 Jan. 25, 2018

(30) Foreign Application Priority Data

Jul. 25, 2016 (IT) .............................. 102016077707

(51) Int. Cl.

| F25C 5/00 | (2018.01) |
| E05F 15/60 | (2015.01) |
| F25C 5/20 | (2018.01) |
| F03G 7/06 | (2006.01) |
| F25D 21/08 | (2006.01) |

(52) U.S. Cl.
CPC ................ *E05F 15/60* (2015.01); *F25C 5/22* (2018.01); *E05Y 2900/31* (2013.01); *F03G 7/065* (2013.01); *F25C 5/24* (2018.01); *F25C 2700/00* (2013.01); *F25D 21/08* (2013.01)

(58) Field of Classification Search
CPC .... F25C 5/005; F25C 5/22; F25C 5/24; F25C 2700/00; E05F 15/60; F25D 21/08; F03G 7/065; E05Y 2900/31; E05B 47/0009

USPC .......................................................... 49/324
See application file for complete search history.

(56) References Cited

U.S. PATENT DOCUMENTS

| 4,569,206 A | 2/1986 | Mitani et al. |
| 5,176,544 A | 1/1993 | AbuJudom, II et al. |

(Continued)

FOREIGN PATENT DOCUMENTS

| DE | 10 2014 206 134 A1 | 10/2015 |
| NL | 8 006 779 A | 7/1981 |
| WO | 2010/066726 A2 | 6/2010 |

OTHER PUBLICATIONS

Italian Search Report for IT 201600077707 dated Mar. 20, 2017.
Italian Written Opinion IT 201600077707 dated: unknown.

*Primary Examiner* — Donnell Long
(74) *Attorney, Agent, or Firm* — Sughrue Mion, PLLC

(57) ABSTRACT

A valve device for an ice dispensing conduit includes a bearing structure having a passage to be coupled with the conduit, an obturator mounted rotatable in the bearing structure between a closed position and an opened position, and a motor for rotating the obturator between the closed position and the opened position. A wire made of a shape-memory material, capable of shrinking when an electric current flows therethrough, has one end anchored to the bearing structure and the other end coupled with the obturator through a transmission mechanism. A flow of an electric current in the shape-memory wire causes a shrinking thereof and a consequent rotation of the obturator towards the opened position, and an interruption of such current allows the shape-memory wire to re-expand and the obturator (12) to return towards its closed position.

3 Claims, 9 Drawing Sheets

(56) References Cited

U.S. PATENT DOCUMENTS

| | | | | |
|---|---|---|---|---|
| 6,675,536 B1* | 1/2004 | Williams | ................ | B63B 19/00 |
| | | | | 292/38 |
| 7,971,393 B2* | 7/2011 | Gao | ........................ | E05F 15/60 |
| | | | | 16/290 |
| 9,790,930 B2* | 10/2017 | Foshansky | .............. | F03G 7/065 |
| 2004/0031301 A1* | 2/2004 | Dominique | ............. | E05B 41/00 |
| | | | | 70/237 |
| 2008/0022674 A1* | 1/2008 | Brown | .................... | F03G 7/065 |
| | | | | 60/527 |
| 2008/0120911 A1 | 5/2008 | Browne et al. | | |
| 2011/0314742 A1 | 12/2011 | Hsu | | |
| 2013/0091772 A1 | 4/2013 | Berger et al. | | |

* cited by examiner

VALVE DEVICE FOR AN ICE CUBE DISPENSING CONDUIT IN A REFRIGERATOR

BACKGROUND OF THE INVENTION

Field of the Invention

The present invention relates to a valve device for an ice cube delivery conduit in a refrigerator.

More specifically, the invention relates to an electric valve device of the type comprising
- a bearing structure, stationary in operation, wherein there is defined a passage intended to be coupled with said dispensing conduit;
- an obturator mounted rotatable in the bearing structure between a closed position and an opened position, wherein it substantially shuts and, respectively, opens said passage; and
- electrically-controlled motor means, connected to the bearing structure and coupled to the obturator and adapted to cause a rotation of said obturator between the closed position and the opened position.

Background

In the present description and in the claims that follow, the term "ice cubes" refers to blocks or pieces of ice of any kind, not necessarily cubic.

In a valve device of the above-defined type according to the prior art, the motor means comprise a bi-directional electric motor, the shaft of which is connected to a worm screw coupled with a toothed sprocket which, by means of a mechanism, is adapted to cause the rotation of the obturator between the closed position and the opened position.

Such solution has various disadvantages.

First, the operation of such a valve device is quite noisy.

Furthermore, in the event of an interruption of the electrical current feed to the motor during a rotation of the obturator, the obturator freezes in an intermediate position between the closed position and the opened position and is not able to return, in particular, to the closed position.

The valve device according to the prior art is also quite expensive.

An object of the present invention is to provide an electric valve device that allows the disadvantages of devices according to the prior art outlined above to be overcome.

SUMMARY OF THE INVENTION

This and other objects are accomplished according to the invention with a valve device of the initially defined type, characterized primarily in that the aforementioned motor means comprise a shape-memory wire that is capable of shrinking when it is traversed by an electric current and having one end anchored to the aforementioned bearing structure and the other end coupled to the obturator by means of a transmission mechanism, such that the feeding of a current to said shape-memory wire is adapted to cause a shrinking and consequent rotation of the obturator toward the opened position, and an interruption of said current allows the elongation of said shape-memory wire and the return of the obturator to the closed position.

In one embodiment, the aforementioned transmission mechanism comprises a connecting rod member mounted translatable and rotatable in the bearing structure, in a plane which is substantially orthogonal to the axis of rotation of the obturator and articulated with a crank member which is integral in rotation with the obturator.

The connecting rod member is appropriately connected to the bearing structure through resilient means which tend to oppose the action exerted onto said connecting rod member by the shape-memory wire.

BRIEF DESCRIPTION OF THE DRAWINGS

Further features and advantages of the invention will become apparent from the detailed description that follows, provided purely by way of non-limiting example with reference to the accompanying drawings, wherein.

DETAILED DESCRIPTION OF THE INVENTION

Figure 1:
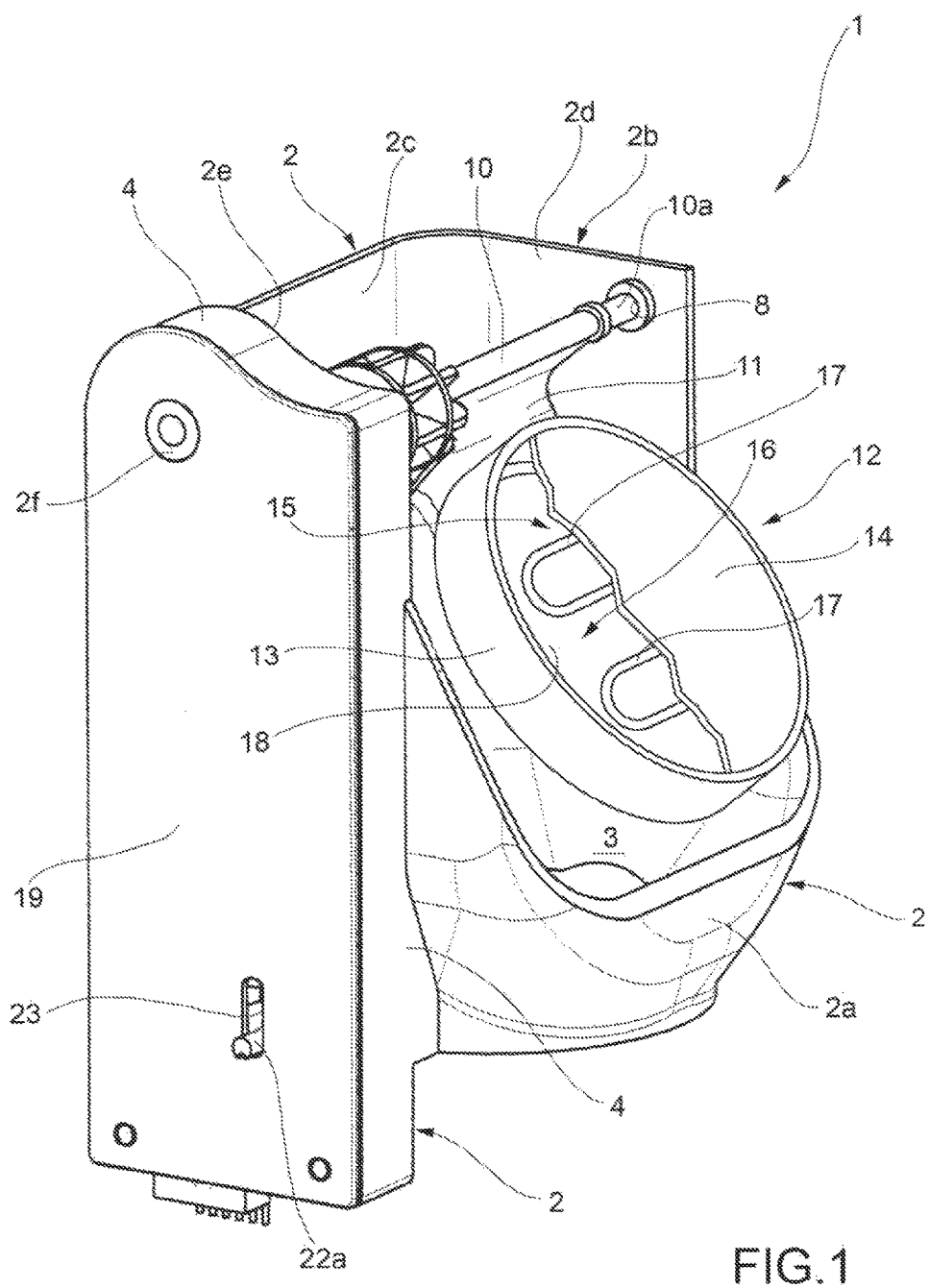
FIG. 1 is a perspective view of a valve device according to the present invention, shown with the obturator in the closed position.
Figure 2:
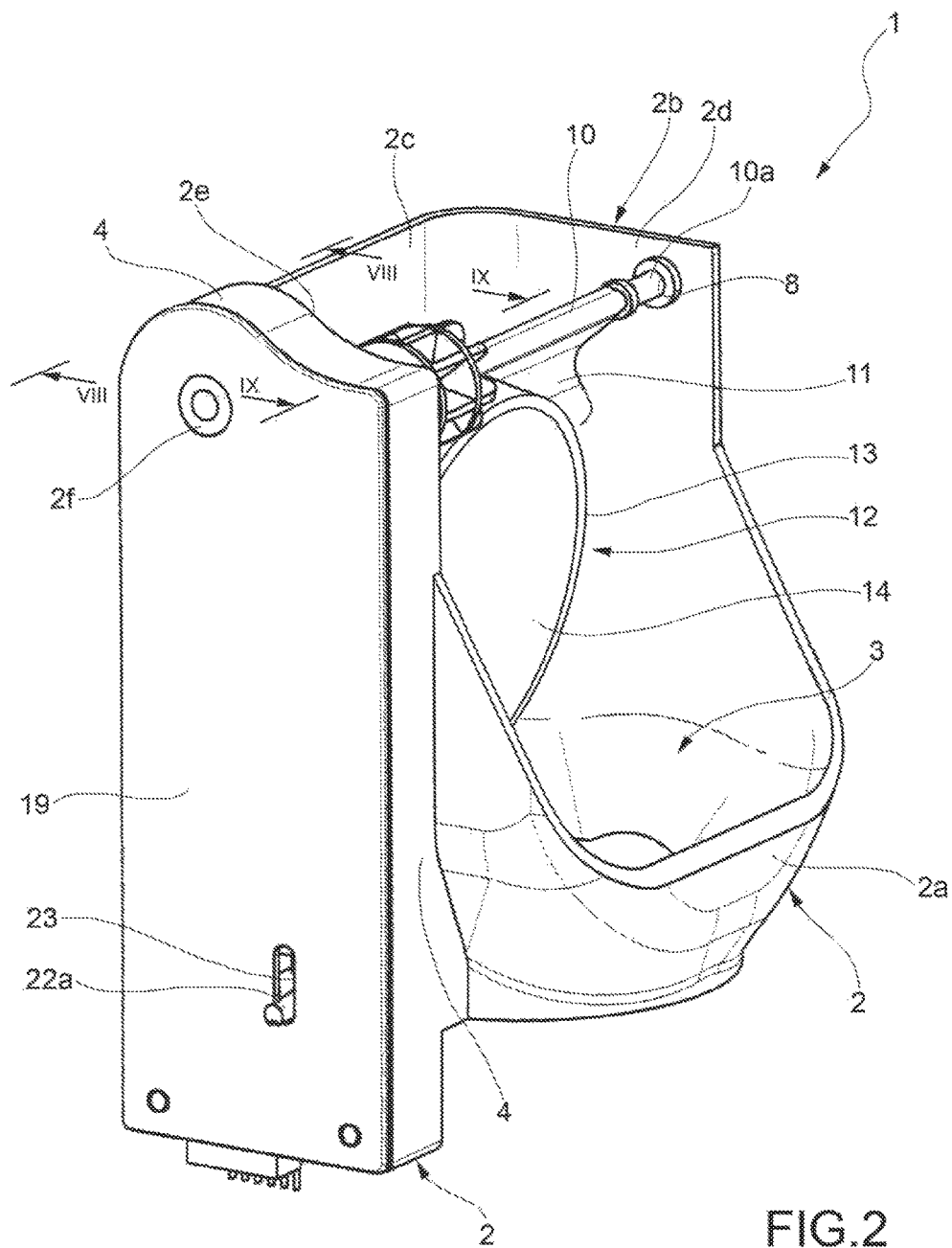
FIG. 2 is a perspective view similar to that shown in FIG. 1 and shows the obturator in the opened position.
Figure 3:
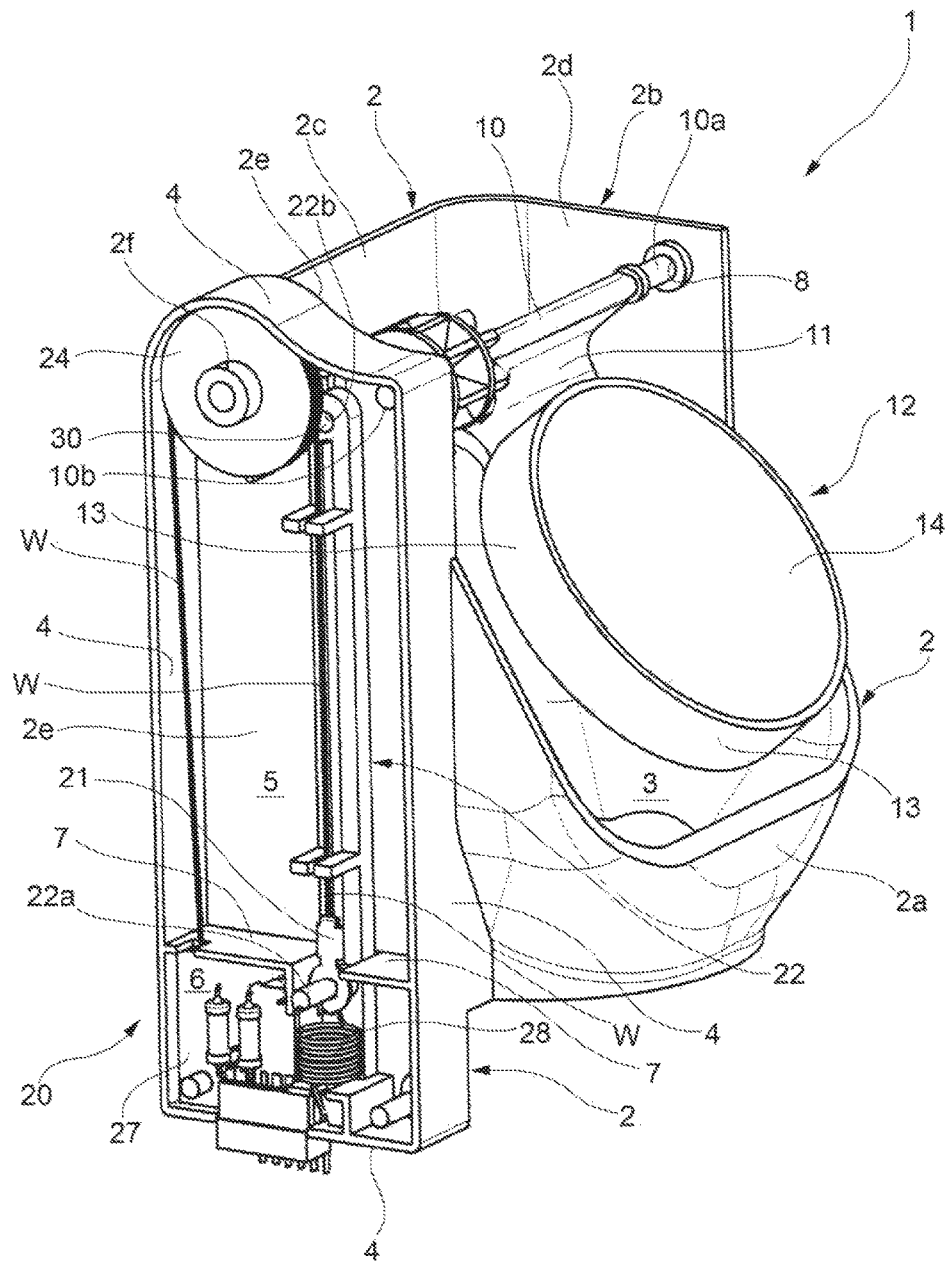
FIG. 3 is a perspective view similar to that shown in FIG. 1 and shows the motor means associated with the obturator.

In FIGS. 1 through 3, at 1 is collectively indicated a valve device according to the present invention for an ice cube delivery conduit in a refrigerator.

The valve device 1 comprises an operatively stationary bearing structure, collectively indicated at 2 in FIGS. 1 through 4.

The bearing structure 2 is appropriately constructed, e.g., by means of a molded plastic material. In the embodiment illustrated by way of example, such structure 2 comprises a lower portion 2a, essentially in the form of a hopper, defining in its interior a passage 3 intended to be coupled to the ice cube dispensing conduit of a refrigerator.

The supporting structure 2 further comprises an upper portion 2b having a horizontal cross-section essentially shaped like a C and including an intermediate wall 2c and two facing end walls 2d and 2e.

As seen in particular in FIG. 3, the wall 2e is surrounded by a side wall 4 extending perpendicular from the wall 2e.

Figure 4:
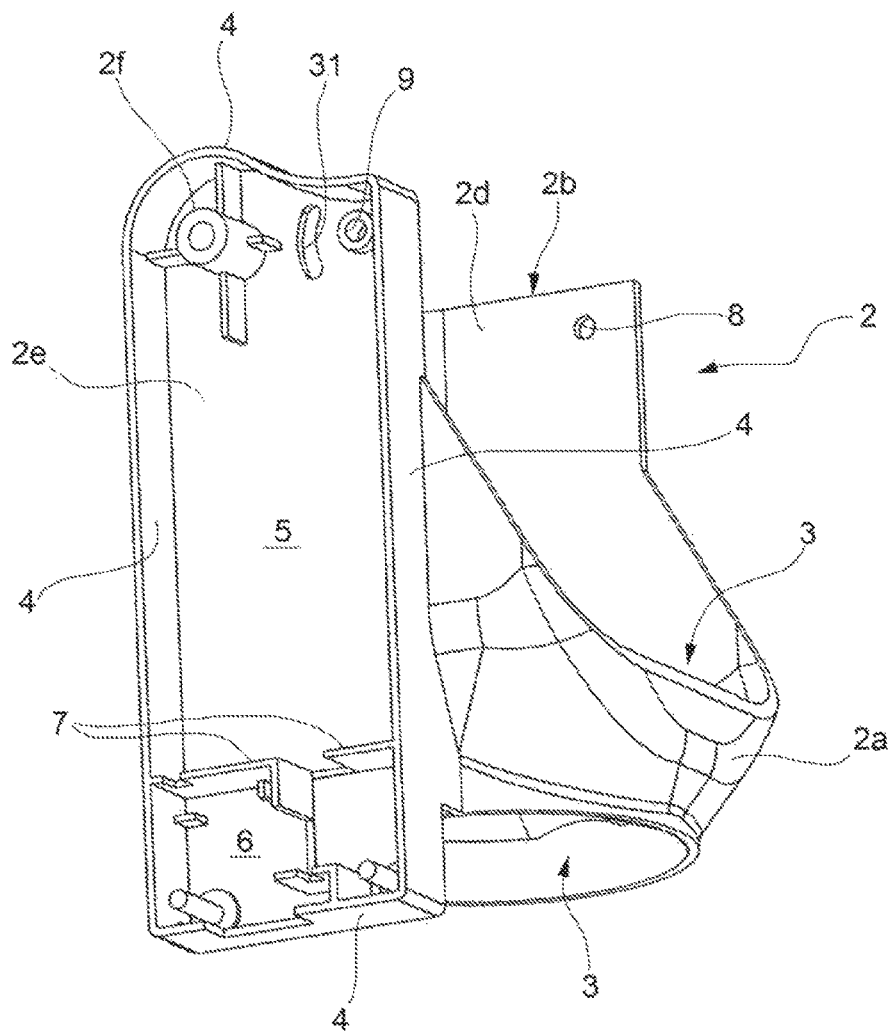
FIG. 4 is a perspective view of the bearing structure of the valve device according to the previous figures.
Figure 8:
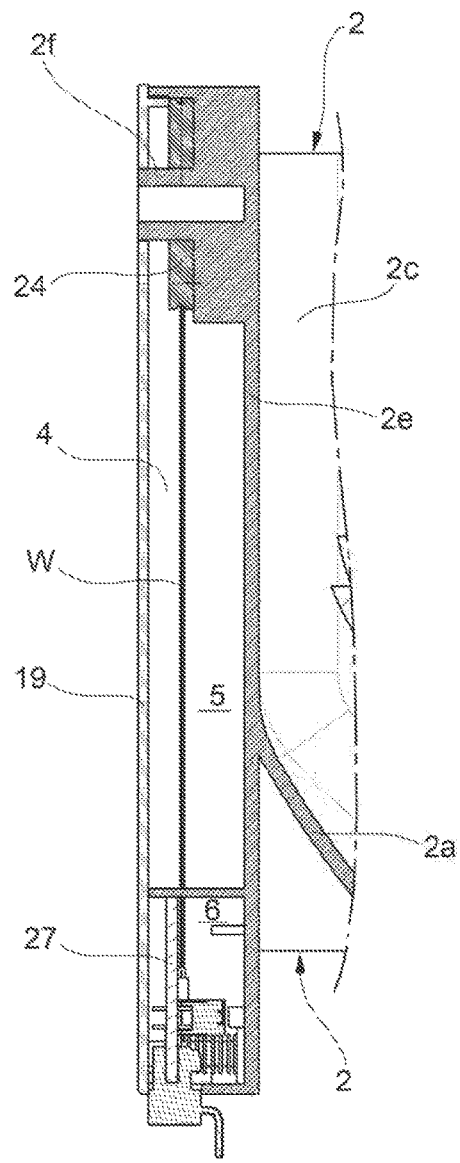
FIGS. 8 and 9 are partial views sectioned according to the lines VIII-VIII and IX-IX respectively of FIG. 2.

This side wall 4 and the wall 2e define a region that is divided into two spaces 5 and 6 by an intermediate horizontal transverse septum 7 (FIGS. 3, 4 and 8).

In the walls 2d and 2e of the upper part 2b of the bearing structure 2, two aligned holes 8 and 9 (see in particular FIG. 4) are provided, in which the opposite ends 10a and 10b of a shaped shaft 10 are supported (FIGS. 1 through 4 and 6).

Figure 6:
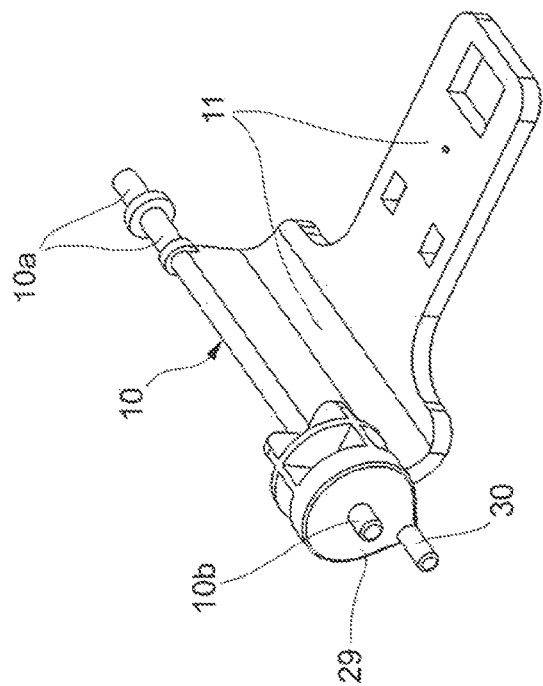
FIG. 6 is a perspective view of a rotating member connected to the obturator of the valve device according to the invention.
Figure 7:
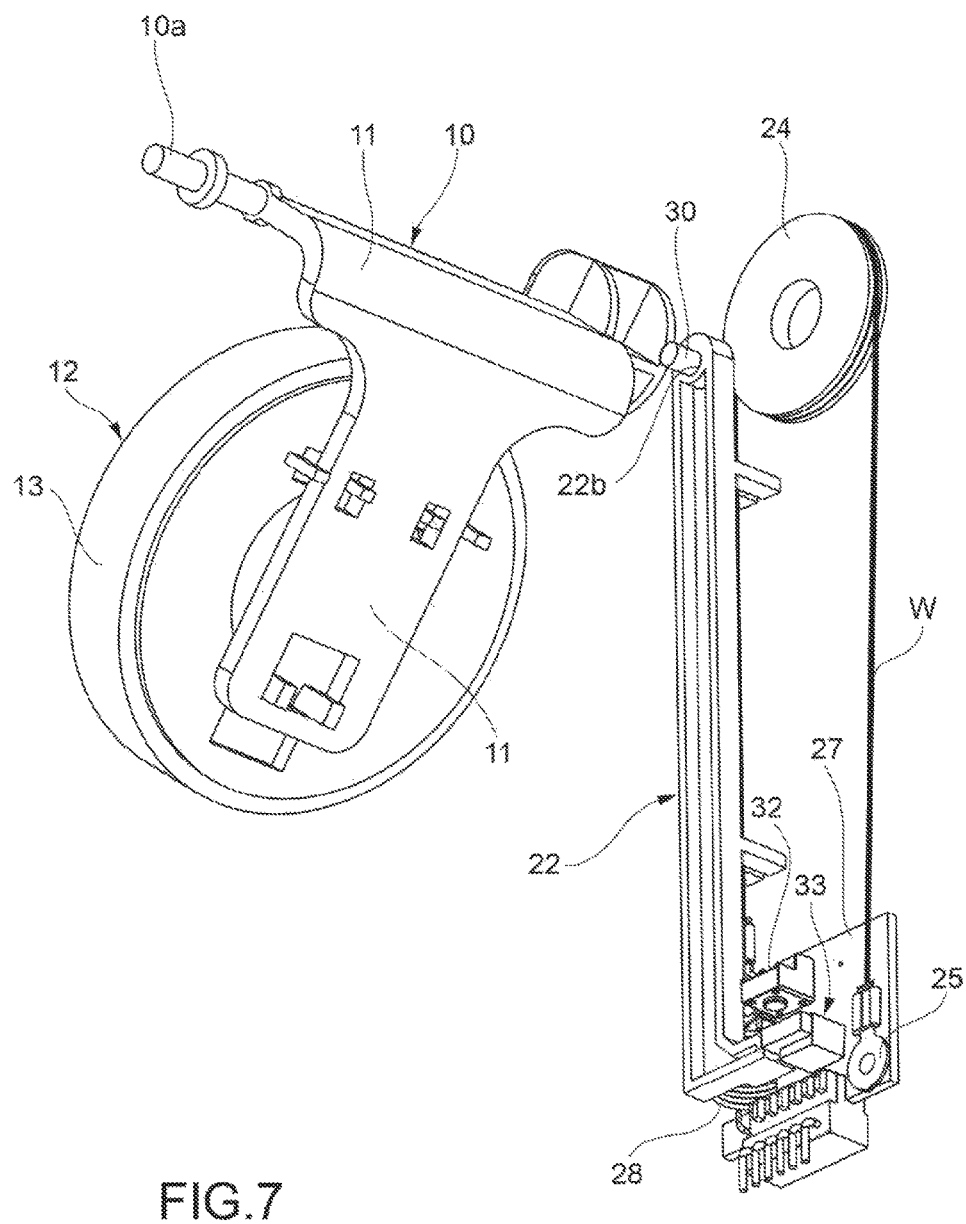
FIG. 7 is a partial perspective view showing the obturator and the associated motor means.

As seen in particular in FIGS. 6 and 7, from the intermediate portion of the shaft 10 extends a curved shaped wing, indicated at 11. To such wing is connected an obturator collectively indicated at 12.

In the embodiment illustrated by way of example, the obturator 12 has a shape collectively in the form of a circular disc.

The obturator 12 in the illustrative embodiment shown in the drawings essentially comprises a circular cylindrical basin-shaped body 13, closed in the front with a circular wall 14 (see FIGS. 1 through 3).

Within the obturator 12, a chamber 15 is defined wherein an electric heater device 16 is appropriately arranged, including, for example, a coil resistor 17 carried by an electrically insulating substrate 18 (FIG. 1).

The resistor 17 is connectable, in a non-illustrated fashion, with a supply voltage source for the objects that will be described later.

The assembly formed by the shaft 10, the associated wing 11 and the obturator 12 may oscillate around the horizontal axis of said shaft 10 between a closed position (shown in FIGS. 1 and 3) and an opened position (shown in FIG. 2).

When the obturator 12 finds itself in the closed position (FIGS. 1 and 3), it is adapted to substantially shuts the passage 3, preventing the ice cubes from coming from a forming device located higher up in the outlet passage 3 and, from this passage, to an underlying collection receptacle.

As will be appreciated, the section of the obturator 12 is smaller than the corresponding section of the passage 3; however, the opening between them is such as to prevent an ice cube with predetermined dimensions from passing through the gap defined between them.

The movement of the obturator 12 between the closed position and the opened position is controlled by means of a device housed in the spaces 5 and 6 defined within the region between the wall 4 and the wall 2e.

In FIG. 3, such control and command device is collectively indicated at 20.

In the assembled condition, appropriately, the region between the side wall 4 and the wall 2e is closed by a cover indicated at 19 in FIGS. 1, 2 and 8.

In the illustrated embodiment, the control and command device 20 comprises a wire W made of a shape-memory material that is adapted to shrink when it is traversed by an electric current and re-expand when such electric current is lost.

Figure 10:
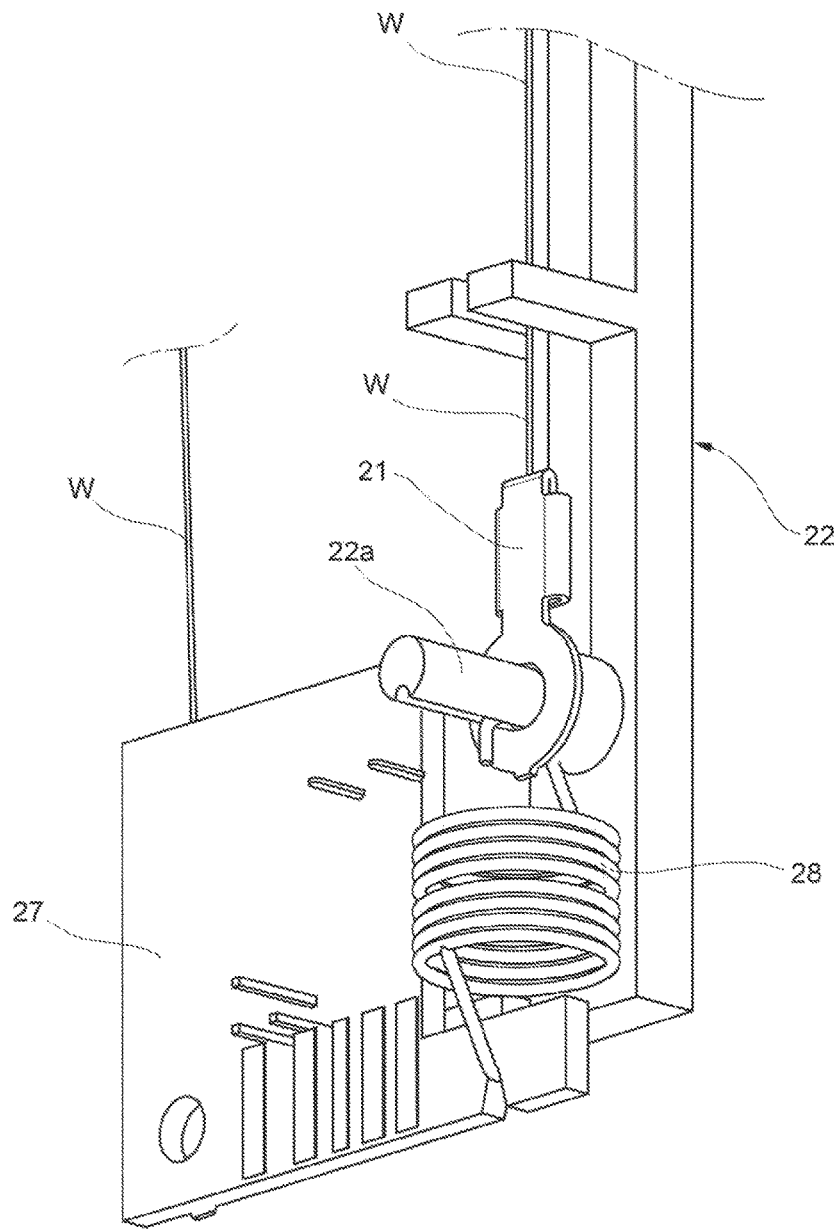
FIG. 10 is a partial front perspective view of the motor means shown in FIG. 3.

The wire W has a terminal 21 anchored to a protrusion in the form of a pin 22a of a member 22 in the form of a connecting rod (see in particular FIGS. 3 and 10).

As can be seen in FIGS. 1 and 2, said protrusion 22a of the connecting rod member 22 extends through a vertical guide slot 23 provided in the cover 19.

As can be seen in FIG. 3, the connecting rod member 22 extends in an essentially vertical direction, through an interruption of the septum 7 and up to the end 10b of the shaft 10 (see FIG. 3).

Starting from the terminal 21, the shape-memory wire W extends essentially in a vertical direction until it reaches the periphery of a guide pulley indicated at 24 in FIGS. 3, 7 and 8, which is mounted rotatable around a tubular protrusion 2f integral with the wall 2e of the bearing structure 2 (FIG. 8).

Figure 11:
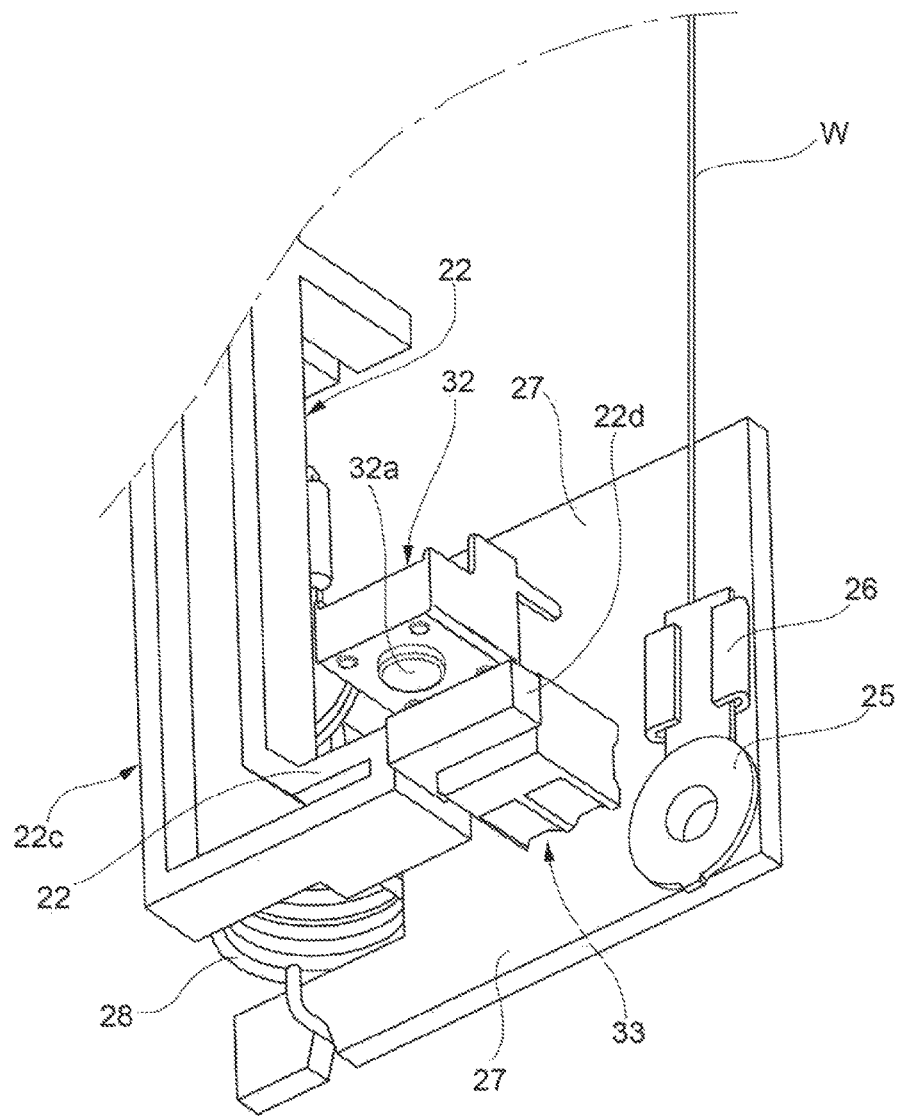
FIG. 11 is a partial rear perspective view of said motor means.

After encircling the upper part of the groove of the pulley 24, the shape-memory wire W extends vertically downward and the lower end thereof is provided with an electrical terminal 25 (FIGS. 7 and 11) connected electrically and mechanically to a terminal 26 fixed to a circuit board 27 mounted in the lower space 6 defined between the wall 4 and the wall 2e (FIGS. 2, 7 and 11).

With reference in particular to FIGS. 3 and 10, the protrusion 22a of the connecting rod member 22 is connected to the upper end of a coil tension spring 28, the other end of which is anchored in a notch of the circuit board 27 (see in particular FIG. 10).

The spring 28 tends to oppose the shrinking of the shape-memory wire W due to the passage of a current therethrough.

With reference in particular to FIGS. 3 and 6, at the end 10b, the shaft 10 has a transverse formation 29 with a protrusion 30, eccentric to the axis of the shaft 10.

Figure 9:
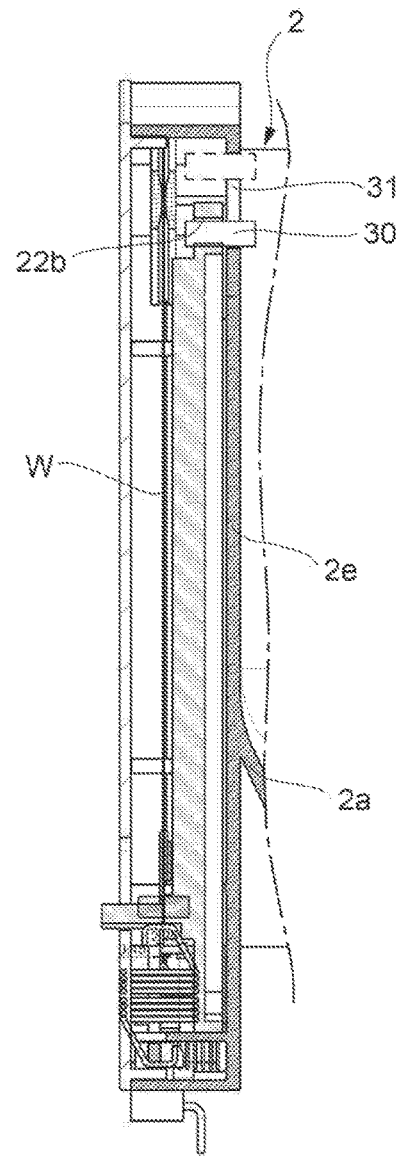

As may be seen in FIG. 9, the eccentric protrusion 30 extends through and beyond an arched slot opening 31 made in the wall 2e in the bearing structure 2 (see also FIG. 4).

The arched opening 31 extends substantially according to an arc with a concentric circumference with the axis of the shaft 10.

Beyond the wall 2e, the eccentric protrusion 30 engages into an end opening 22b of the connecting rod member 22.

The connecting rod member 22 and the formation 29 with the associated eccentric protrusion 30 form a slider-crank mechanism, mechanically coupled to the shaft 10.

Figure 5:
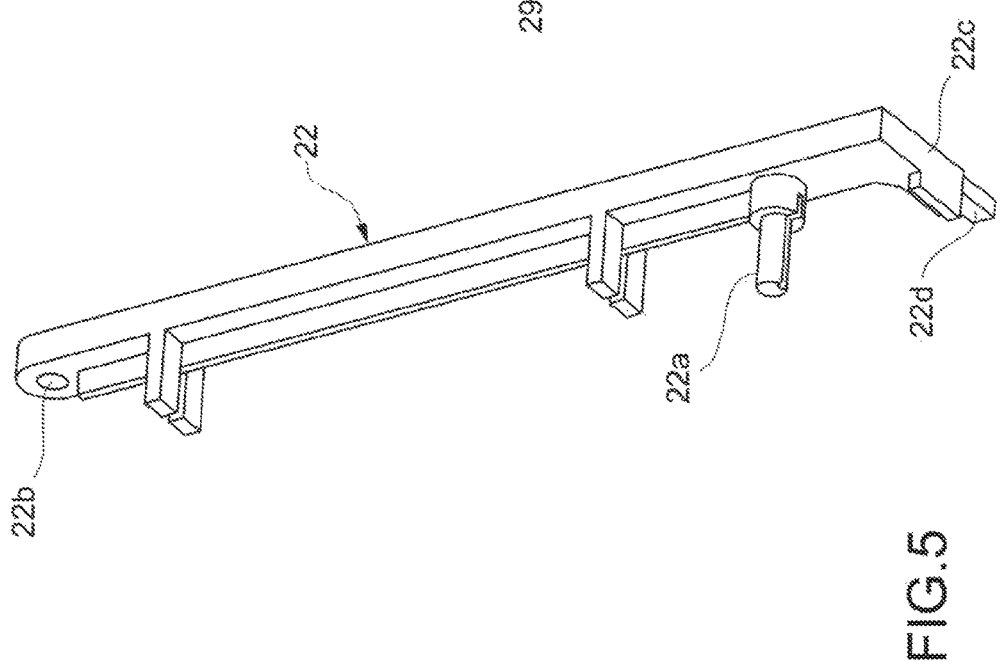
FIG. 5 is a perspective view of a connecting rod member comprised in a transmission mechanism of a valve device according to the invention.

With reference to FIGS. 5 and 11, the lower end of the connecting rod member 22 is essentially shaped like an L and has a transverse arm 22c facing the actuating member 32a of a micro-switch 32 carried by the circuit board 27 (FIG. 11).

The function of this micro-switch 32 is described below.

The transverse arm or branch 22c of the lower end of the connecting rod member 22 forms a terminal finger 22d (FIGS. 5 and 11) intended to cooperate with a photoelectric detector device 33 (FIG. 11) comprising, for example, an LED diode and an associated phototransistor.

The object of the photoelectric detector 33 is described in the following.

The valve device described above operates substantially as follows.

When the shape-memory wire W is not carrying current, it assumes the configuration shown in FIG. 3: under the action of the tension spring 28, the connecting rod member 22 is held in a lowered position, whereby the eccentric protrusion 30 of the transverse formation 29 of the shaft 10 extends essentially at the lower end of the slot opening 31 of the wall 2e of the bearing structure 2.

In such condition, the shaft 10 finds itself in an angular position so that the obturator 12 assumes the closed position shown in FIGS. 1, 3 and 7.

When the user of the refrigerator appliance to which the valve device 1 is associated requires the dispensing of ice cubes, a control unit of the refrigerator appliance, connected to the circuit board 27 of the valve device 1, couples the shape-memory wire W to a voltage source that causes the passage of an electric current through such wire.

As a result of this passage of current, the wire W shrinks and, by overcoming the opposing action of the tension spring 28, causes a vertical lifting of the lower end of the connecting rod element 22. The upper end of said connecting rod element 22 in turn causes the displacement of the eccentric protrusion 30 upwards into the curved slot opening 31 (FIG. 4) and a consequent rotation, in a clockwise direction for an observer of FIGS. 1 and 3, of the shaft 10 and the obturator 12 integral with it.

Consequently, the obturator 12 is brought into the opened position shown in FIG. 2.

The passage 3 is then cleared whereby the ice cubes produced by an overlying device (not shown) may be delivered through the passage 3 to an underlying collecting receptacle.

When the dispensing is completed, the control unit of the refrigerator appliance by means of the circuit board 27 determines the interruption of the current in the shape-memory wire W, which cools down and consequently re-expands. Under the action of the tension spring 28, the lower end of the connecting rod member 22 is then drawn downward, guided by the vertical slot 23 (FIGS. 1 and 2) and, consequently, the protrusion 30 of the transverse formation 29 of the shaft 10 is drawn downward in the arched slot 31. This results in a rotation of the shaft 10 and of the associated obturator 12, counterclockwise for an observer of FIG. 2, until the obturator 12 resumes the position of rest.

In the operating cycle described above, the micro-switch 32 is actuated by the arm 22c of the connecting rod member 22 when the obturator 12 reaches the opened position of FIG. 2 and provides a corresponding signal to the control unit of the refrigerator appliance.

The photoelectric detector 33 instead provides a signal to such control unit when, subsequently, the obturator 12 returns to the rest position following the interruption of the current in the shape-memory wire W.

As those skilled in the art may readily understand, the control and command device 20 associated with the obturator 12 has an absolutely silent operation.

In addition, if the power supply is interrupted during rotation of the obturator following the cooling and re-expansion of the shape-memory wire W, the obturator is automatically brought back to the closed position.

If, when the obturator is closed, an ice cube remains trapped between the obturator and the dispensing conduit, the photoelectric detector 33 signals such condition to the control unit of the refrigerator appliance and said unit may then activate the heating resistor 17, arranged in the obturator 12, so as to melt said ice cube.

The resistor 17 may furthermore be activated when the obturator 12 is locked in the closed position due to the formation of ice between the same and the dispensing conduit.

Naturally, without altering the principle of the invention, the embodiments and the details of implementation may vary widely with respect to those described and illustrated purely by way of non-limiting example, without thereby departing from the scope of the invention as defined in the appended claims.

The invention claimed is:

1. A valve device for an ice cube dispensing conduit in a refrigerator, comprising:
   a bearing structure, stationary in operation, wherein there is defined a passage to be coupled with said dispensing conduit;
   an obturator mounted rotatable in the bearing structure, between a closed position and an opened position, in which it substantially shuts and opens said passage, respectively; and
   an electrically-controlled motor means, connected with the bearing structure and coupled with the obturator and adapted to cause a rotation of the obturator between the closed position and the opened position,
   wherein said motor means comprise a wire of a shape-memory material, capable of shrinking when an electric current flows therethrough, and having a first end anchored to said bearing structure and a second end coupled with the obturator through a transmission mechanism, such that a flow of an electric current in said shape-memory wire causes a shrinking thereof and a consequent rotation of the obturator towards the opened position, and an interruption of said current allows the shape-memory wire to re-expand and the obturator to return towards its closed position,
   wherein said transmission mechanism comprises a connecting rod member mounted translatable and rotatable in the bearing structure, in a plane which is substantially orthogonal to the axis of rotation of the obturator and articulated to a crank member which is solid for rotation with the obturator, wherein the connecting rod member is connected to the bearing structure through a resilient member which opposes the action exerted onto said connecting rod member by the shape-memory wire, and
   wherein the second end of the shape-memory wire is anchored to the connecting rod member, the shape-memory wire extending from the second end to a guide pulley mounted rotatable to the bearing structure and, after encircling the guide puller, to the first end anchored to the bearing structure.

2. The valve device according to claim 1, wherein with said connecting rod member there are associate first and second detector means adapted to provide respective electric signals when the obturator reaches the closed position and the opened position, respectively.

3. The valve device according to claim 1, wherein with the obturator there are associated electric heating means.

\* \* \* \* \*